United States Patent [19]
Gorski

[11] 3,810,636
[45] May 14, 1974

[54] BEARING SEALING STRUCTURE

[75] Inventor: Paul T. Gorski, Mishawaka, Ind.

[73] Assignee: Reliance Electric Company, Mishawaka, Ind.

[22] Filed: Feb. 14, 1972

[21] Appl. No.: 226,126

[52] U.S. Cl............................. 277/94, 308/187.2
[51] Int. Cl............................................ F16j 15/34
[58] Field of Search ........... 308/187.2, 214; 277/94, 277/81, DIG. 14

[56] References Cited
UNITED STATES PATENTS
3,366,428  1/1968  Smith................................ 277/94
3,330,607  7/1967  Delp ................................. 277/94

Primary Examiner—Robert B. Hull
Assistant Examiner—Robert L. Smith
Attorney, Agent, or Firm—Marmaduke A. Hobbs, Hobbs & Green

[57] ABSTRACT

A sealing structure for a bearing having an outer race with an inwardly extending annular rib and an inner race with an outwardly extending annular rib in which said sealing structure consists of an annular plastic member having an inner and outer pair of spaced radially extending flanges for embracing the respective annular ribs on the inner and outer races, forming sealing surfaces between said respective flanges and the sides of the respective ribs. The material from which the sealing structure is made is preferably plastic, such as nylon, and an annular recess may be provided in the center of the outside surface of the structure to improve the flexibility thereof. A lubricant passage connects the inner surface of the bearing with space between one pair of flanges.

11 Claims, 5 Drawing Figures

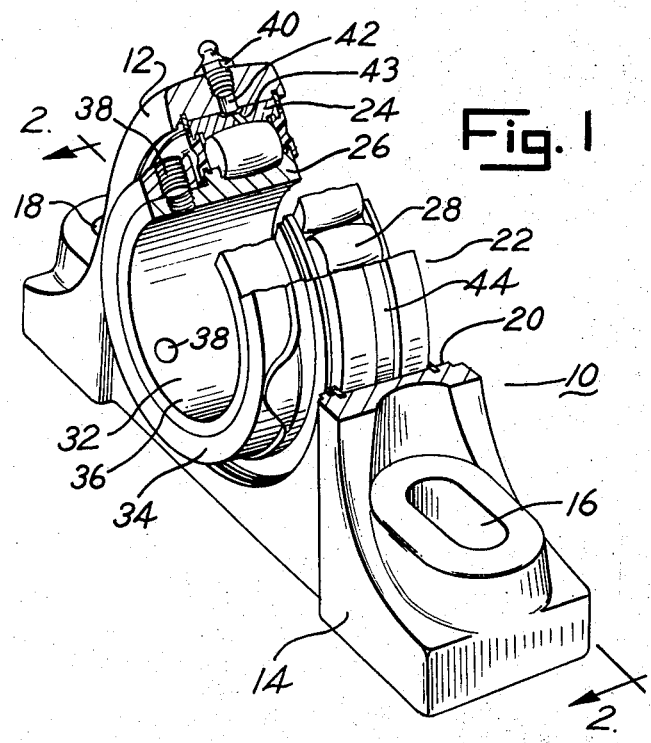
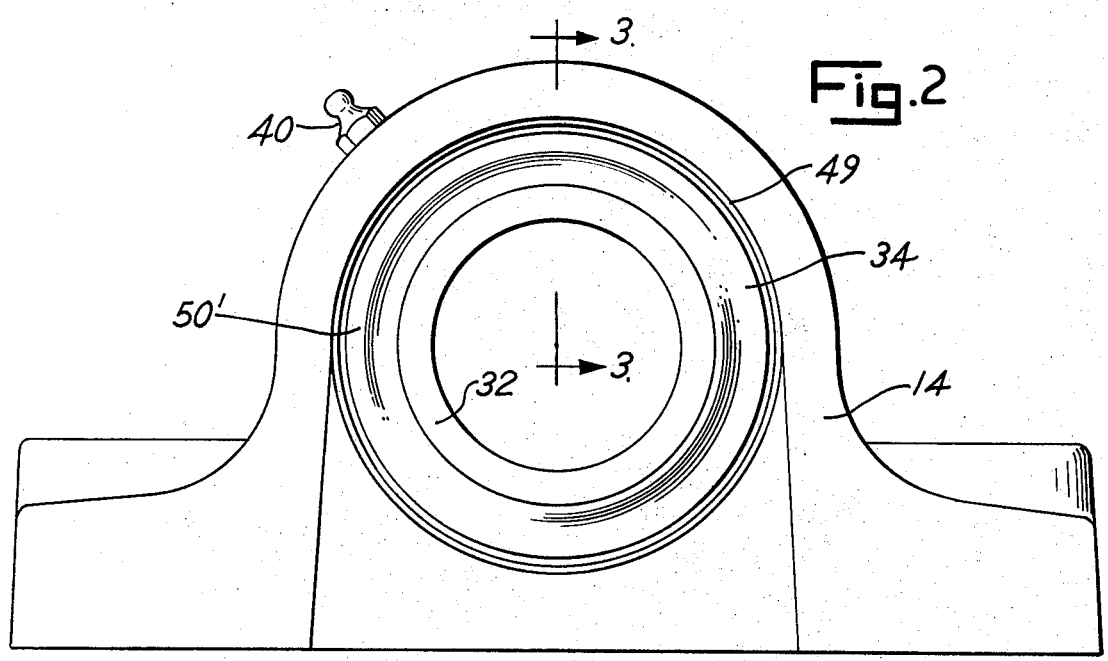

BEARING SEALING STRUCTURE

Conventional ball and roller bearings are often used in installations where they may readily become contaminated from dirt, moisture and other foreign matter from their surrounding operating conditions and environment, unless protected by effective seals disposed between the outer and inner races. These seals not only exclude the foreign matter which might be injurious to the bearing but also retain the lubricant in the bearing structure between the two races. Since the seals are used to close the space between two relatively rotating parts, an effective seal is often difficult to maintain with a single surface contact between the seal and a single annular surface on each of the relatively rotating parts. Consequently, labyrinth seals having a series of annular passages between relatively rotating parts, or multiple element seals of rubber or plastic, or combinations of both of these basic materials, are used. Both of these two types of seals are complicated in structure, costly, and frequently difficult to install and service, and often involve elements constructed of both rubber or rubber-like materials and plastic such as nylon, which must be assembled separately and often retained in effective sealing relationship with the relatively rotating parts of the bearing by mechanical spring means. Efforts have been made to utilize seals for the foregoing applications constructed solely of nylon seating on grooves and/or against annular sealing surfaces, but this type of seal has generally been unsatisfactory since nylon will become permanently deformed from constant pressure thereon by the bearing parts, and will lose much of its effectiveness as a seal both in excluding contaminants and retaining the lubricant in the bearing structure. It is, therefore, one of the principal objects of the present invention to provide a single sealing structure for ball and roller bearings which is constructed of plastic, such as nylon, and which has a plurality of annular sealing surfaces which effectively retain the lubricant in the bearing and exclude contaminants therefrom.

Another object of the invention is to provide a nylon bearing seal which is so constructed and designed that it will retain its optimum sealing characteristics over long periods of time regardless of normal operating pressures to which it is subjected, and which can readily be installed in the bearing structure between the outer and inner races and will seat in proper sealing position automatically when inserted in the bearing structure.

Still another object of the invention is to provide a relatively simple and inexpensive bearing seal consisting primarily of a single element, which will seat on and adjust to the sealing surfaces on the relatively rotating parts of the bearing, and which can be easily fabricated using standard equipment and technology. A further object is to provide a bearing seal of the aforementioned type which operates effectively in sealing the space between two relatively rotating parts without any appreciable friction or wear over extended periods of time, and which assists in prolonging the optimum operation of the bearing.

Additional objects and advantages of the invention will become apparent from the following description and accompanying drawings wherein:

FIG. 1 is a cut-away perspective view of a bearing having the present sealing structure incorporated therein;

FIG. 2 is a side elevational view of the bearing shown in FIG. 1;

Figure 3:
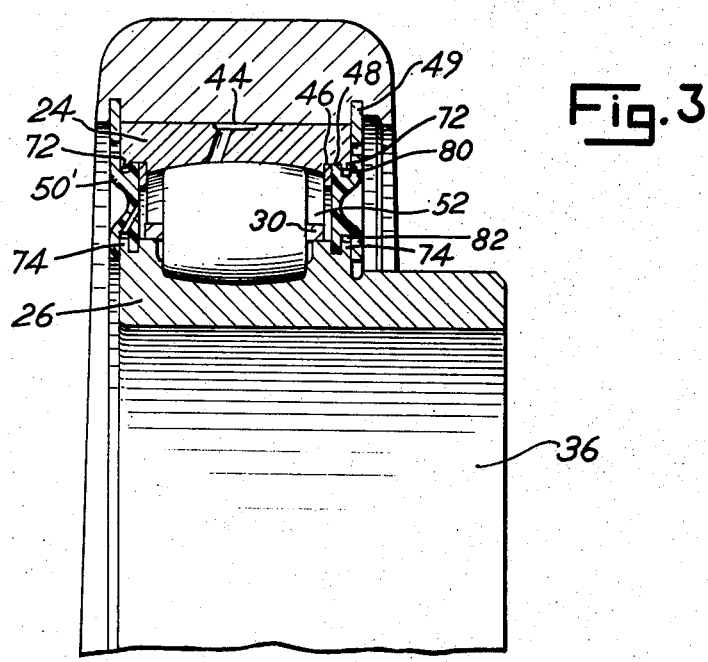
FIG. 3 is a vertical cross-sectional view of the bearing shown in the preceding figures, the section being taken on line 3—3 of FIG. 2.
Figure 4:
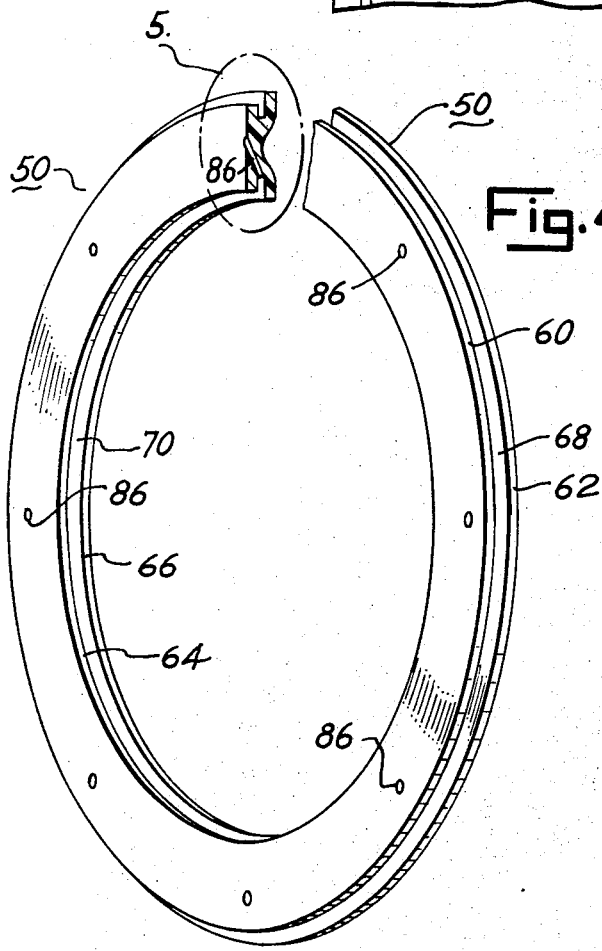
FIG. 4 is an enlarged perspective view of the seal used in the bearing, showing a portion of the seal broken away to illustrate more effectively the structure.
Figure 5:
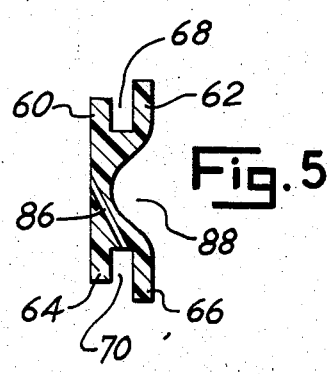
FIG. 5 is a cross-sectional view of the seal shown in FIG. 4, the section being taken at the place indicated by the circle identified by the numeral 5.

Referring more specifically to the drawings and to FIG. 1 in particular, numeral 10 indicates generally a shaft bearing having a housing 12 with a base 14 containing a plurality of holes 16 and 18 for securing the bearing to a suitable support, the housing normally being made of cast iron or cast steel and having a center opening indicated by numeral 20. The particular type of housing or bearing is not critical with respect to the present sealing structure so long as the anti-friction elements are of the ball or roller type.

Mounted in opening 20 is the bearing assembly 22 having an outer race 24, an inner race 26 and a series of spherical rollers 28, held in spaced relation to one another by a cage 30. The inner race is provided with a cylindrical bore 32 for receiving, and rotating with, a shaft extending therethrough. A ring 34 is mounted on extension 36 of the inner race and has set screws 38 extending through extension 36 and seating on the shaft for holding the inner race of the bearing in fixed relation with the shaft. The bearing is lubricated through fixture 40 and passages 42 and 43 in the housing and outer race, respectively. Passage 42 communicates with an annular groove 44 on the external surface of the outer race, which in turn communicates with the passages 43 in the outer race. A snap ring 46 is seated in a groove 48 in the inner surface of the outer race for retaining the cage and rollers in proper operating position in the space between the inner and outer races, and snap rings 49 retain the outer race in place in the housing.

The seals 50 and 50' embodying the present invention are disposed on opposite sides of the inner and outer races and form a cavity 52 for the ball or roller bearings and cage and for the lubricant which surrounds the ball or roller bearings and cage. The seals have outer annular flanges 60 and 62 and inner annular flanges 64 and 66. Flanges 60 and 64 are on the internal side of the seal, and flanges 62 and 66 are on the external side of the seal. The two flanges 60 and 62 define an annular groove 68 and flanges 64 and 66 define an annular groove 70, annular groove 68 receiving an annular rib 72 on the outer race and annular groove 70 receiving an annular rib 74 on the inner race. Since seals 50 and 50' are identical in construction, shape and operation, only one will be described in detail, and like numerals will be applied to the other seal.

The surfaces of flanges 60 and 62 facing one another and the surfaces of flanges 64 and 66 facing one another form sealing surfaces on opposite sides of annular ribs 72 and 74, and the bottom of grooves 68 and 70 are preferably slightly spaced from the inner axial surface of the two ribs, as seen at numerals 80 and 82. Since the outside surfaces of ribs 72 and 74 form the outer surfaces of outer and inner races 24 and 26, the inside surfaces of flanges 62 and 66 are, in effect, sealed on the external surface of the two races.

The seals 50 and 50' may be made of a variety of different plastic materials. Preferably, however, they are constructed of nylon which is flexible yet sufficiently rigid to hold its shape effectively under normal operating conditions. Since the inner race is rotatable in the outer race, ribs 72 and 74 rotate relative to one another, and the seal may rotate relative to both of the two annular ribs. Preferably, however, the seal will remain stationary with respect to the stationary outer race and the inner race will rotate relative thereto. In order to eliminate the friction between the facing walls of flanges 64 and 66, the spaced annular groove 70 receives lubrication from internal cavity 52 of the bearing through a plurality of outwardly extending passages 86. The lubricant flowing through the passages finds its way onto the facing surfaces of flanges 64 and 66 and onto the opposite surfaces of rib 74. Similar passages may be provided to annular groove 68 if desired, thus permitting the seal to rotate freely between the two races. An annular center groove 88 is preferably provided in the external surface of the seal in order to render it sufficiently flexible that it can be readily inserted between the two annular ribs 72 and 74 during the assembling operation.

In the assembly and operation, the bearing is assembled in the usual manner with the inner and outer rollers and cage assembled therebetween and secured in place by the two snap rings 46. Flanges 60 and 64 are distorted sufficiently to slip them over annular ribs 72 and 74 and to seat them in the groove adjacent the inner side thereof. When the ribs 72 and 74 are seated in annular grooves 68 and 70, the inner and outer flanges 64 and 66 seat on the opposite surfaces of the two ribs, thus forming good sealing surfaces for excluding contaminants and preventing lubricant from seeping from cavity 52. The inner surface of flange 60 also may seat on the external surface of snap ring 46. The contacting relatively moving surfaces between ribs 74 and flanges 64 and 66 are lubricated by lubricant from cavity 52 through passages 86. These passages also function to relieve pressure when cavity 52 is being filled with lubricant, thus preventing excessive pressure from dislodging the seals from their seats.

It is seen that the present seal has a plurality of effective sealing surfaces without requiring appreciable pressure on the seal or distortion of the seal during the operation of the bearing. Consequently, the seal effectively excludes foreign matter from cavity 52 and prevents any substantial amount of lubricant from seeping from cavity 52. The seal, therefore, because of freedom from distortion and significant pressure, has a long life, and the effectiveness of the seal imparts long life to the bearing.

While only one embodiment of the present bearing sealing structure has been described in detail herein, various changes and modifications may be made without departing from the scope of the invention.

I claim:

1. A sealing structure for a bearing having an outer race with an inwardly facing annular rib, and an inner race with an outwardly facing annular rib: said structure comprising a unitary annular body of plastic material, a pair of spaced annular flanges in parallel relationship extending radially outwardly disposed on said body for engaging in sealing relation opposite sides of the annular rib on the outer race, and a pair of spaced annular flanges in parallel relationship extending radially inwardly disposed on said body for engaging in sealing relation opposite sides of the annular rib on the inner race.

2. A sealing structure for a bearing as defined in claim 1 in which the plastic material of said annular body is nylon.

3. A sealing structure for a bearing as defined in claim 1 in which one of the spaced annular flanges of said body is of a greater diameter than the other of said flanges.

4. A sealing structure for a bearing as defined in claim 1 in which said flanges are rectangular in cross section and the space between said flanges form a groove rectangular in cross section.

5. A sealing structure for a bearing as defined in claim 4 in which one of the spaced annular flanges of said body is of a greater diameter than the other of said flanges.

6. A sealing structure for a bearing as defined in claim 5 in which an annular recess is disposed in the central portion of said body for improving the flexibility thereof.

7. A sealing structure for a bearing as defined in claim 6 in which said passage connects the space between the inner pair of flanges with the inside surface of the sealing structure.

8. A sealing structure for a bearing as defined in claim 6 in which said plastic material is nylon.

9. A sealing structure for a bearing as defined in claim 1 in which an annular recess is disposed in the central portion of said body for improving the flexibility thereof.

10. A sealing structure for a bearing having an outer race with an inwardly facing annular rib, and an inner race with an outwardly facing annular rib: said structure comprising an annular body of plastic material, a pair of spaced annular flanges extending radially outwardly disposed on said body for engaging in sealing relation opposite sides of the annular rib on the outer race, and a pair of spaced annular flanges extending radially inwardly disposed on said body for engaging in sealing relation opposite sides of the annular rib on the inner race, the space between one of the pairs of said annular flanges being connected by a passage to the inside surface of said body.

11. A sealing structure for a bearing as defined in claim 10 in which said passage connects the space between the inner pair of flanges with the inside surface of the sealing structure.

* * * * *